United States Patent Office 3,516,398
Patented June 23, 1970

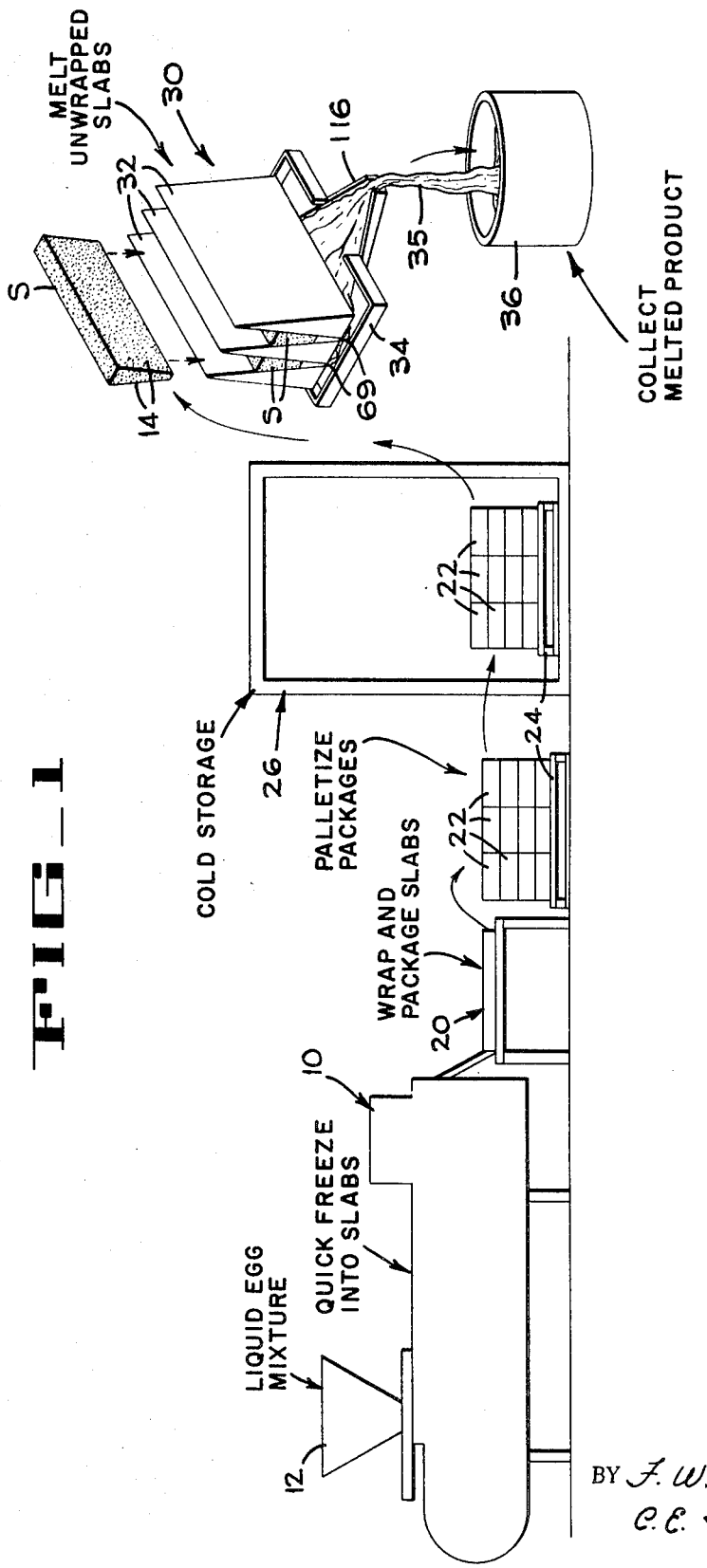

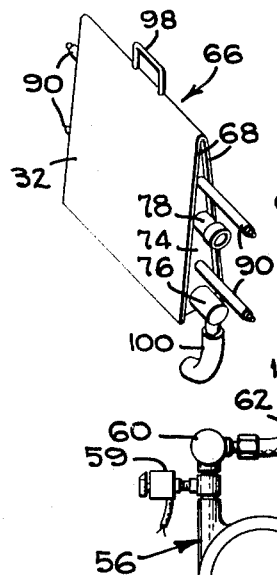
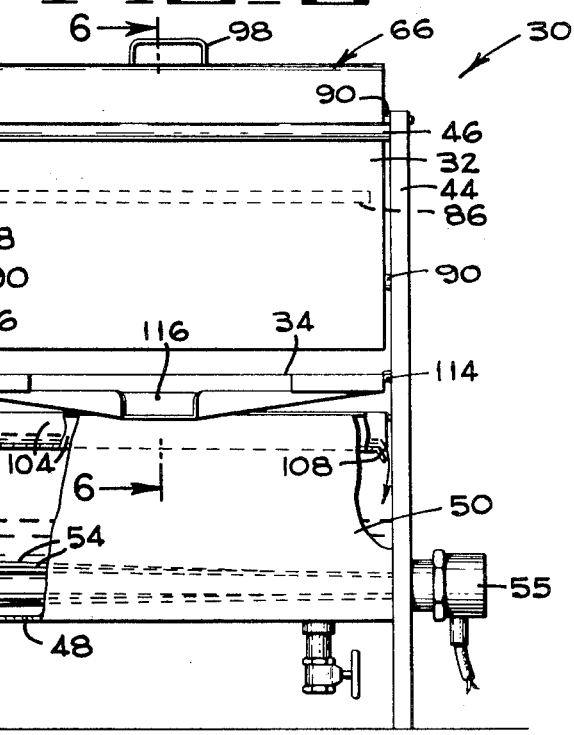
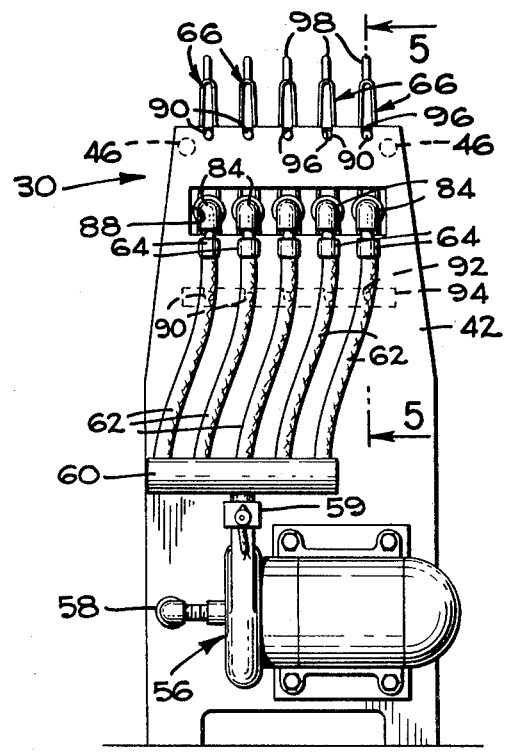
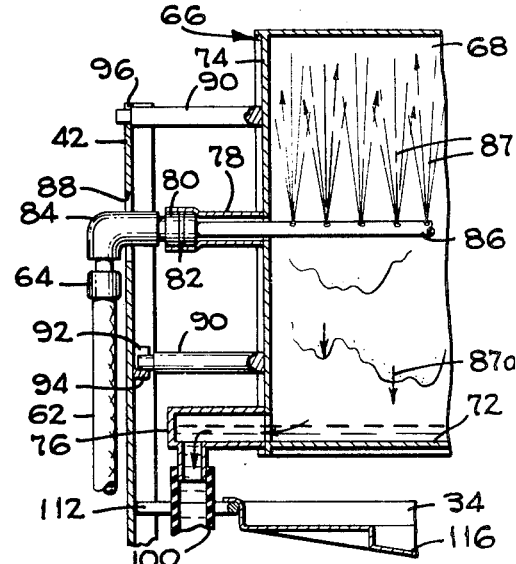

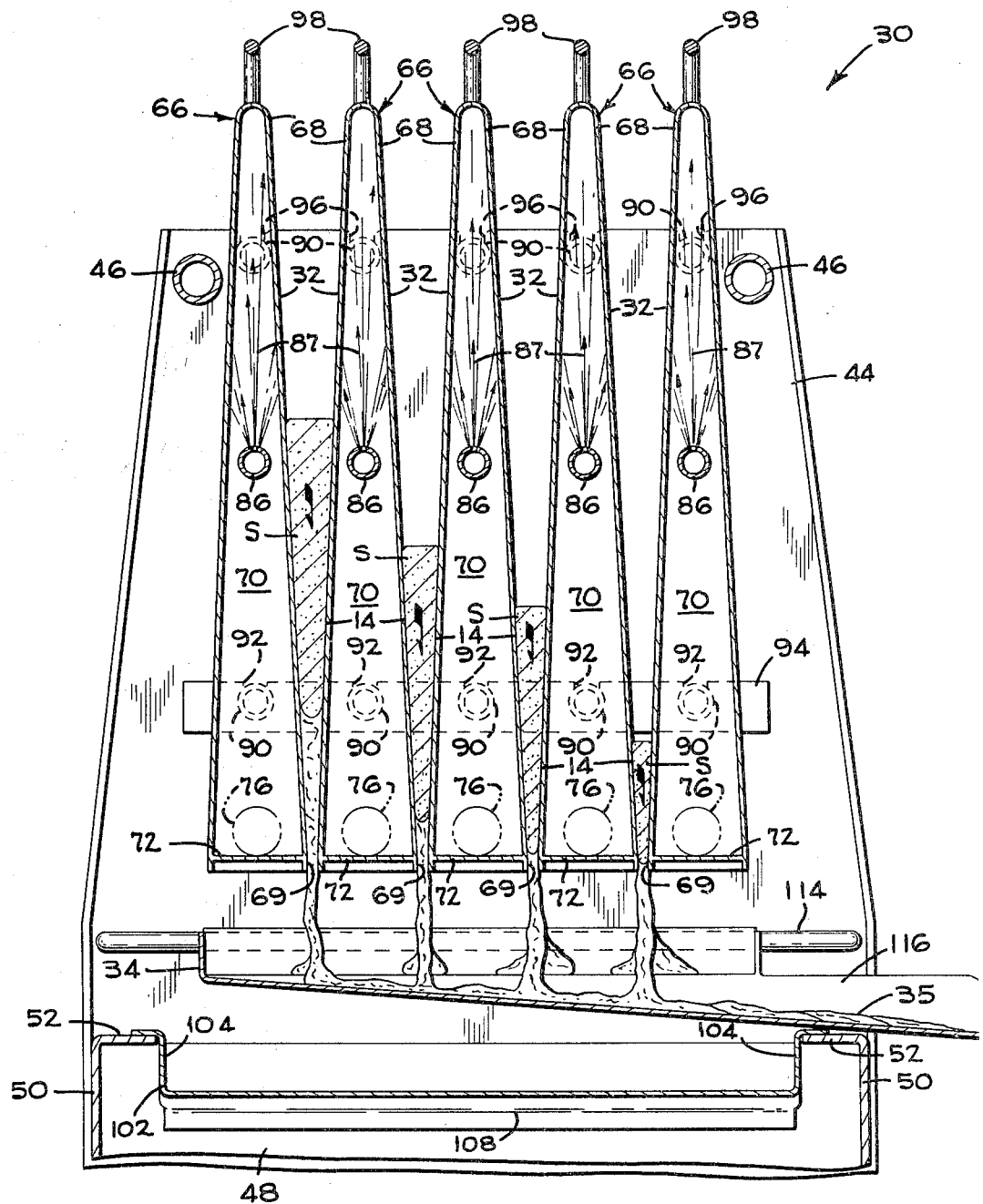

3,516,398
APPARATUS FOR MELTING A FROZEN FOOD PRODUCT
Katsuji Hirahara, San Jose, Calif., assignor to FMC Corporation, San Jose, Calif., a corporation of Delaware
Filed Apr. 1, 1968, Ser. No. 717,551
Int. Cl. F28f *3/08*
U.S. Cl. 126—343.5                     5 Claims

ABSTRACT OF THE DISCLOSURE

A process including a quick freezing step for preparing, storing and handling liquid food products such as shelled fresh eggs, and apparatus for rapidly melting the product to restore it to its initial liquid condition. The process eliminates the usually required tin containers for egg products by molding egg mixtures into slabs which are then wrapped and stored. The apparatus utilizes pairs of heated, downwardly converging heat conductive plates to support the frozen slabs. The slabs are tapered top to bottom so that the sides of the slab have total surface contact with the plates, thus effecting a relatively rapid melting operation with a relatively low heat input.

BACKGROUND OF THE INVENTION

The present invention pertains to freezing processes and apparatus, more particularly to a method for preparing, storing and handling fresh egg products, and to apparatus for melting the frozen product for use.

At the present time, wholesale bakeries, mayonnaise manufacturing plants, and other users of large amounts of shelled eggs do not ordinarily store the egg mixture, but order it as needed. The supplier furnishes the eggs in frozen condition in 30 pound cans. The cans must be sterilized before use, require manual (and hence sometimes inaccurate) filling, plus up to 42 hours for a complete freezing and melting cycle. The cans also require special pallet loading for air circulation among the cans during both freezing and melting, necessitate separate refrigeration for freezing and storage, and can by Federal law only be used once. Further, the product must be melted before it can be removed from the can, and it is economically impractical to scrape each can to retrieve all of the product. Therefore, the cumulative loss of product when cans are used is usually substantial. Because the melting requires a long time, a production run must be scheduled ahead to melt the exact amount of product necessary, thus resulting in an inflexible procedure if more product is needed, or possible waste if too much product has been melted.

SUMMARY OF THE INVENTION

In contrast to the above outlined conventional process, the present process eliminates the use of the cans by molding the egg mixture into quick-frozen slabs at a rate of about six slabs (30 pounds) per minute. The slabs are then individually wrapped in an appropriate film wrapper, or the like, which will strip freely from the frozen slab and be compatible with the product. The slabs are then packed in cartons and the cartons are stacked on pallets, during which time the cartons can conveniently be held in interim storage without special refrigeration. When a pallet or group of pallets is loaded with cartons, the pallets are placed in a refrigerated room for prolonged storage at a temperature which will maintain the slabs in frozen condition. When an order of slabs is delivered to a customer, the slabs are unwrapped, and placed in the apparatus portion of the present invention in order to melt the product to its original condition. The slab melter will liquefy a 5 pound slab of whole eggs in about 9–10 minutes. Slabs of egg whites can be liquefied in 5–6 minutes. Further, the melting is accomplished at this relatively rapid rate using a relatively low heat input of about 62° F. The specific process steps, the rapid melting, and the low heat input for melting minimize the danger of promoting bacterial growth.

BRIEF DESCRIPTION OF THE DRAWINGS

FIG. 1 is a schematic representation of the apparatus used in carrying out the process steps of the invention.

FIG. 2 is a side elevation, partly broken away, of the slab melting apparatus of the present invention.

FIG. 3 is a perspective, at slightly reduced scale, of one of a plurality of heat conductors which melt the slabs for use.

FIG. 4 is an end elevation of the FIG. 2 apparatus.

FIG. 5 is an enlarged fragmentary section of a heat conductor plate, taken along lines 5—5 on FIG. 4.

FIG. 6 is an enlarged vertical fragmentary section taken along lines 6—6 on FIG. 2.

DESCRIPTION OF THE PREFERRED EMBODIMENT

The continuous freezing machine 10 (FIG. 1) is of the general type disclosed in U.S. Patent to Lampman 3,335,-579, wherein a plurality of open top molds are intermittently conveyed through a brine tank to freeze the product in the molds into slabs S (shown at the right end portion of the apparatus in FIG. 1) following which the frozen bonds between the slabs and the molds are thawed and the product slabs are removed. This thawing operation may be termed thaw-releasing the product. In the present example, a filler unit 12 is supplied with a liquid mixture of shelled fresh eggs and operates to automatically fill each mold with the egg mixture.

Each slab S is molded to a configuration about 23 inches long, about 6 inches high, and with a top to bottom taper. The top thickness is about 1 inch and the bottom thickness is about ⅞ of an inch. These dimensions are merely given as examples and do not directly relate to the invention except that the slab is thin to promote both rapid freezing and quick melting, and the slab has a tapered cross section with predominantly planar side surfaces 14 for maximizing heat transfer contact with the slab when it is melted, as will later appear.

After the slabs S are released from the freezing machine 10, they are individually wrapped in a wrapping machine 20 with a material such as one of the transparent film wraps in use which will strip readily from the slab during unwrapping. Six of the 5 pound slabs are then packaged in a cardboard carton 22 to produce a package unit equal in weight to the conventional 30 pound can, but the wrapping and packaging materials for each carton cost less than half the cost of the conventional can.

The containers 22 may conveniently be stacked on a pallet 24 to mechanize further handling. Due to the wrapping and packaging of the slabs and their relatively rapid production, no refrigeration is necessary while a pallet load of about 1000 pounds is accumulated. This interim storage capability is thus important insofar as efficient and economical handling procedures are concerned since there is no need of rushing each package as produced ito a refrigerated environment. Thus, a fork lift truck can periodically transfer groups of pallets into a cold storage room 26 where the packages are held until an order is received and filled.

Subsequent to delivery at the customer's plant, the wrappings on the slabs are stripped off and set aside. It should be noted that removal of the wrappings results in access to all of the product, whereas when the product is in cans it must first be melted before it can be removed from the can, and retrieval of all of the product is not economically feasible since it entails manual scraping or prolonged inversion of the cans for drainage. It is also important that the wrappings of the slabs are more compact and easily discarded and destroyed than are the presently used cans.

Each unwrapped, frozen slab S is inserted edgewise, with its narrow edge down, into a slab melter 30. The slab melter includes heated conducting surfaces 32 that are maintained at a temperature of about 62° F. and which, due to the same angularity between confronting conducting surfaces as the angularity between opposite sides of the slabs S, maintain continuous and total contact with the planar slab sides 14. In about 9–10 minutes, each 5-pound slab of whole eggs is completely restored to its initial liquid state, while slabs of egg white will melt in about 5–6 minutes. A product collection tary 34 collects and delivers the liquid egg mixture 35 for immediate use, or to a storage vessel 36 if the product is used in batches.

Before describing the slab melter 30, following are some specific processing data that are useful in practicing the process steps just outlined.

Pasteurized whole egg mixtures, egg white mixtures, or egg yolks mixed with sugar to prevent gelation during freezing can be used in the present process. With moderately agitated brine solution at −28° F. to −30° F., the 5-pound slabs, or slabs approximating 1 inch in thickness are frozen in 18 to 20 minutes.

After leaving the brine solution, the mold bond to the frozen slab can be defrosted after 1 minute by surrounding the mold with 110° F. to 120° F. water for only 2 seconds, but if the mold is heated sooner than 1 minute after removal from the brine, the defrosting time must be, of course, increased. After a frozen slab of whole eggs or egg whites is extracted from the mold, it can easily be held, if necessary, at ambient temperature for up to 10 minutes before wrapping. Sugared egg yolk slabs, however, should be wrapped within about 2 minutes because the corners of the slabs begin to melt faster than with the whole egg or egg white slabs. There should be a holding period of about ½ minute before wrapping sugared egg yolk slabs, however, to allow surface refreeze after the defrosted slab is removed from the mold. Polyethylene film wrapping in tube form, with heat-sealed ends, is one form of enclosure which will satisfactorily strip away from the frozen slab when the slab is eventually unwrapped and placed in the slab melter 30 for melting and subsequent use.

In order to facilitate cleaning, the slab melter 30 (FIGS. 2–4) is constructed for quick dismantling, without tools, and provides complete access to all parts which contact the frozen slabs. The framework of the melter includes floor-supported end plates 42 and 44 which are interconnected by tie rods 46 and by an upwardly open water collection tank 48. Tank 48 is provided with side walls 50 having inwardly extending flanges 52, as shown in FIG. 6.

During operation of the slab melter, water is heated in the tank 48 by a plurality of electrically energized and thermostatically controlled immersion heaters 54 which are connected to junction boxes 55, only one box being shown. The heated water is circulated by an electric motor and centrifugal pump unit 56 which has its suction inlet connected to an outlet pipe 58 that communicates with the interior of the tank. The discharge of the pump is sensed by an adjustable thermostat 59 that controls energization of the immersion heaters 54, and is connected to a manifold 60 to distribute the heated water under pressure to five flexible hoses 62. Each hose is provided with snap connectors 64, so that it can be readily removed when the slab melter is dismantled for cleaning, and delivers the water into a hollow heat conductor unit 66.

Each heat conductor unit 66 (FIGS. 3 and 6) is an independent, box-like structure that has heat-conducting sidewalls 68 that are downwardly divergent and provide tapered slab receiving pockets bounded by the heated conducting surfaces 32. The walls 68 of the heat conductor units 66 have lower end portions which are closely spaced from one another to form product discharge gaps 69, for example about ⅛ of an inch wide or less, to control the amount of frozen product which can drop through without being completely melted. Because the amount of unmelted product will change the average temperature of the product collected in the product collection tray 34, a smaller gap will raise the average temperature of the melted product, and a larger gap will lower the average temperature. An end wall 70 and the bottom wall 72 of the heat conductor unit are closed, while the other end wall 74 is provided with an L-shaped drain pipe 76 (indicated in phantom lines in FIG. 6) and with an inlet pipe 78 at an intermediate zone in the end wall.

As best shown in FIG. 5, the inlet pipe 78 has a bell end which slidably receives a hollow cylindrical mounting plug 80. The plug 80 carries an O-ring 82 for forming a water seal with the inlet pipe 78, and is attached to an inlet L 84 and a spray tube 86 that distributes water sprays 87 between the side walls 68. By removing the snap connector 64, the spray tube assembly including the inlet L and mounting plug can be withdrawn as a unit through an apertured portion 88 of the end wall 42.

Support of the heat conductor units 66 is by means of endwise projecting support rods 90 that are welded to the end walls 70 and 74. The end portions of the lower rods 90 are supported in upwardly open slots 92 that are formed in bars 94 secured to the end walls 42 and 44, and the upper bars 90 rest in similar upwardly open slots 96 that are formed in the end walls. Rapid installation or removal of the heat conductor units 66 is thus easily accomplished, when the spray tube 86 is removed, by grasping a handle 98 and guiding the support rods 90 into or out of the slots 92 and 96.

The water spray within each heat conductor unit 66 is multi-directional to provide substantially uniform coverage, and hence heating, of the walls 68. As indicated by the flow lines 87a (FIG. 5), the heated water clings to the wall 68 by surface tension and washes downward in sheets over the entire surface of the wall. Eventually flowing out the drain pipe 76, the water is guided through a downwardly directed conduit in the form of a rubber elbow 100 into a tray 102. The tray 102 is removably supported by the flanges 52 (FIG. 6) of the tank 48, and is provided with upstanding side walls 104, and an upstanding end wall 106 adjacent the elbow 100. The end of the tray remote from the elbow is open, and is provided with a downturned lip 108 that allows the water collected in the tray 102 to reenter the tank 48 at the end remote from the pump so that it will circulate over the immersion heaters 54.

Intermediate the trays 102 and the heat conductor units 66 the product collection tray 34 is removably mounted on a U-shaped bar 112 welded to the end wall 42, and on a similar bar 114 welded to the end wall 44. As shown in FIGS. 2 and 6, the product collection tray 34 underlies the heat conductor units and is provided with a laterally directed trough portion 116 into which the melted product gravitates, and by means of which the melted product at 35 (FIG. 1) is delivered into the storage vessel 36.

In operation of the slab melter 30, the pump unit 56 and the immersion heaters 54 are energized to circulate heated water through the heat conductor units 66 (FIG. 6). When heated, the conducting surfaces 32 are maintained at about 62° F. by the spray jets 87. A slab S is then inserted into each inlet throat defined by the confronting, heated conducting surfaces 32 of adjacent heat conductor units 66; due to the heated walls 68 having the same angular interrelation as do the sides of the slabs, total contact and maximum heat transfer with the slabs is instantly received. As the melting process begins, the liquified egg product 35 slides down over the faces of the heated walls 68, is accumulated in the inclined trough 116, and flows by gravity into the vessel 36 (FIG. 1).

An important operating condition is that because the melting occurs at the sides of the frozen slab S, the slab is progressively reduced in thickness and slides downward between the heated walls 68, thus always maintaining total side surface contact with the walls. A further important aspect of the melting cycle is that the weight of the slab and gravity forces the melted product downward free of the slab. The melting faces of the slab are thus kept relatively free of melted product which would otherwise tend to insulate the faces of the slab and inhibit heat transfer between the slab and the heated walls.

Another important aspect of the invention is that by spacing the lower end portion of the walls 68 as described above, some amount of unmelted product will drop through into the product collection tray 34. In this way the average temperature of the melted mixture 34 accumulated in the collection tray is minimized. Thus, even though the melting operation is carried out at one temperature, the temperature of the end result product might be considerably lower, depending on the size of the lower gap between the walls 68 and the resultant amount of unmelted product mixed with the melted product. According to the product being handled, how long it may be subject to deterioration, and so forth, this temperature control capability can be used to prolong the holding period (by using a larger gap) before the product is stored. Successive slabs can be inserted as soon as any one slab has melted sufficiently to be lowered by gravity to a position where a succeeding slab will achieve total contact with the walls 68.

From the preceding disclosure, it will be seen that the slab melting apparatus operates according to a unique structural arrangement which assures positive, rapid melting of the tapered type of frozen product slab disclosed, without any moving parts, and without the application of excessive heat that is known to be deleterious to egg mixtures, and that the method of preparing, storing and handling fresh egg products provides a more economical, sanitary and convenient system than the conventional procedures previously outlined.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for melting downwardly tapering frozen product slabs comprising a frame, a plurality of slab melting units, said units being formed as independent box-like structures having downwardly divergent slab melting side walls, end walls and a bottom wall, said units having internal hot liquid spray tubes and drain tubes connected to their end walls, means removably mounting said units in the frame and in spaced relation to provide tapered slab receiving pockets between the units, a melted product collecting tray removably mounted in said frame beneath said units, and means detachably connected to said unit spray tubes for circulating hot liquid through the units.

2. The apparatus of claim 1, wherein said spray tubes are at intermediate zones in the unit end walls.

3. The apparatus of claim 1, wherein a liquid collection tank is mounted in the frame beneath said tray, and wherein said drain tubes have downwardly extending conduits for directing heating liquid down past the collecting tray, for return to said tank.

4. The apparatus of claim 1, wherein said melting unit mounting means comprises rods projecting endwise from the units, and support means on said frame for the rods.

5. The apparatus of claim 3, comprising liquid heating elements in said tank, a pump for withdrawing hot liquid from said tank, and quick detachable connections between the delivery side of said pump and the spray tubes of said units.

References Cited

UNITED STATES PATENTS

| 2,548,177 | 4/1951 | Tauber | 126—343.5 |
| 2,916,262 | 12/1959 | Flores | 126—343.5 |
| 3,180,630 | 4/1965 | Endres et al. | 126—343.5 X |
| 3,362,399 | 1/1968 | Lindenfeld | 126—343.5 |

WILLIAM E. WAYNER, Primary Examiner

U.S. Cl. X.R.

165—165